Nov. 21, 1967       D. B. PRESCOTT       3,353,712
FLUID DISPENSING SYSTEM INCORPORATING A FLUID ACCUMULATOR
Filed Feb. 9, 1966       2 Sheets-Sheet 1
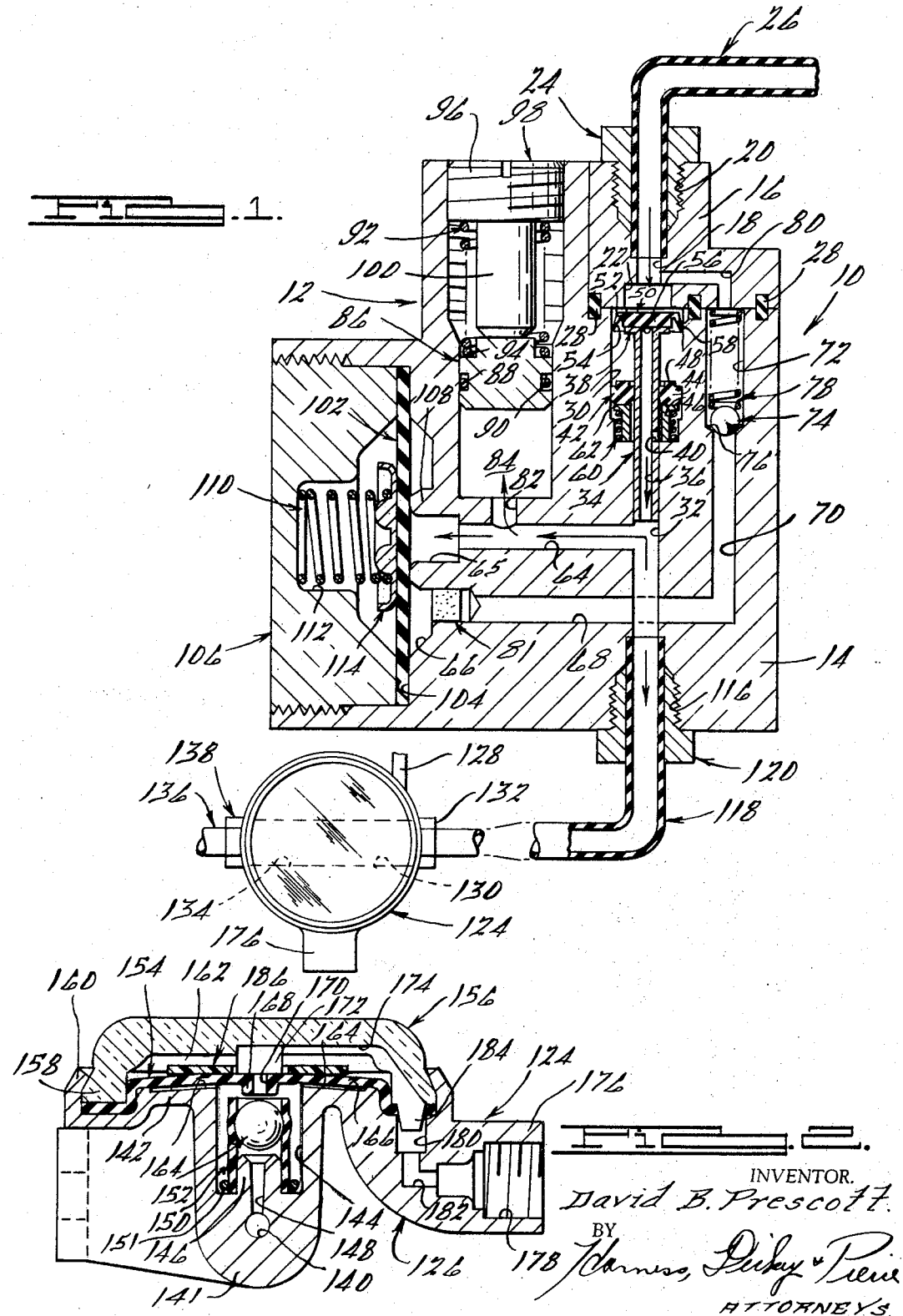
INVENTOR.
David B. Prescott
BY
Harness, Dickey & Pierce
ATTORNEYS

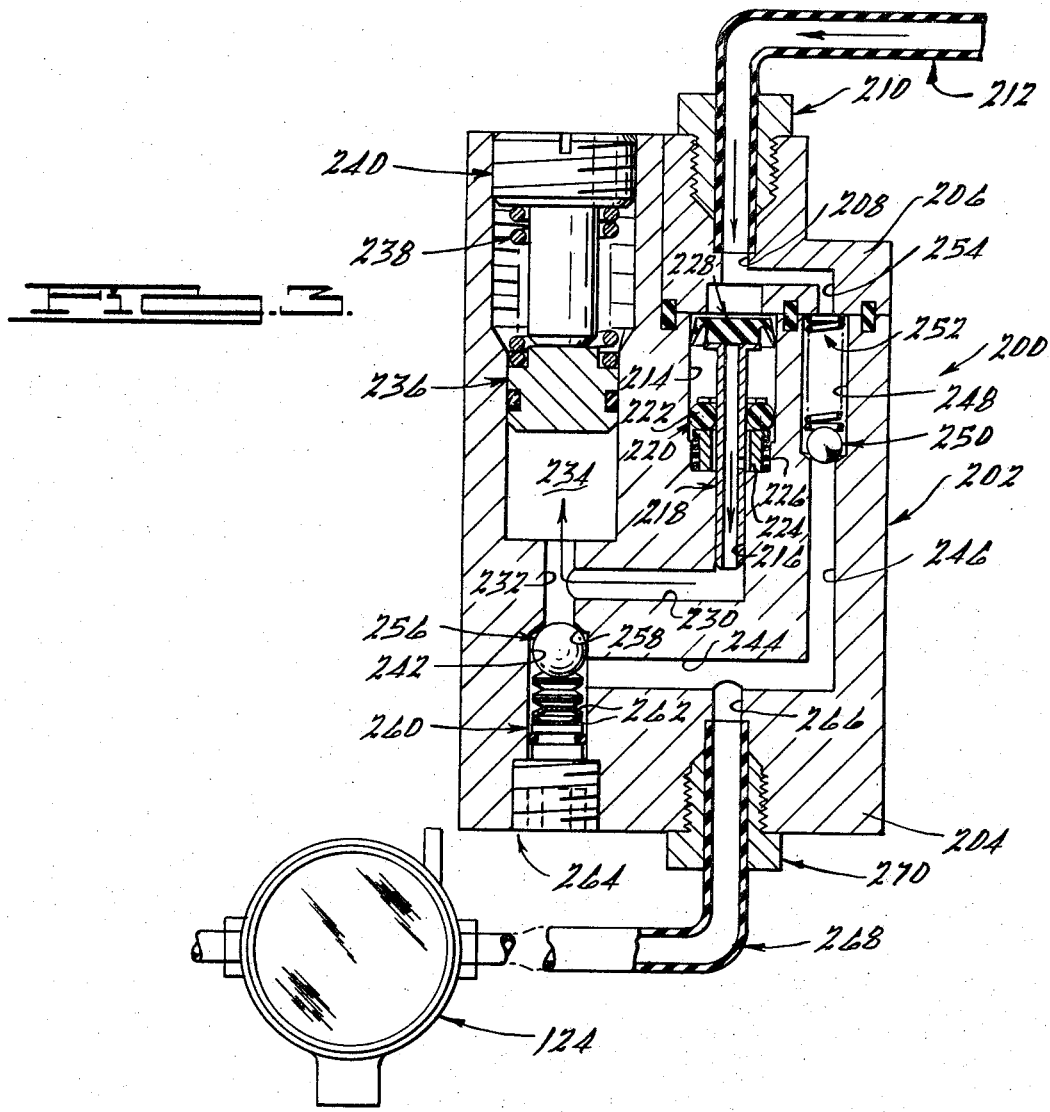

United States Patent Office 3,353,712
Patented Nov. 21, 1967

3,353,712
FLUID DISPENSING SYSTEM INCORPORATING A FLUID ACCUMULATOR
David B. Prescott, Racine, Wis., assignor to Walker Manufacturing Company, Racine, Wis., a corporation of Delaware
Filed Feb. 9, 1966, Ser. No. 526,154
10 Claims. (Cl. 222—56)

ABSTRACT OF THE DISCLOSURE

Two embodiments of fluid dispensing systems incorporating a series of pressure responsive metering valves each of which delivers fluid to a remote point in response to pressure variations. Each system also includes a fluid displacement meter that sequentially delivers a predetermined quantity of fluid to a fluid accumulator. The accumulator is sized to hold a predetermined volume of fluid and when charged with that volume the accumulator is discharged to the inlet side of the fluid displacement meter by means of a pressure responsive relief valve and check valve circuit. Sequential charging and discharging of the accumulator creates a pressure variation upon the fluid metering devices that causes them to be operated.

---

This invention relates generally to fluid metering systems and, more particularly, to a new and improved apparatus for periodically dispensing preselected shots or charges of fluid, such as oil or lubricant.

It is an object of the present invention to provide a metering system which accepts pressure pulses from a pump (or other pressure cycle source) operating on a certain time cycle but is capable of dispensing fluid on a different time cycle.

It is also an object of the present invention to provide a fluid metering system which may function to automatically meter predetermined amounts of fluid different than those supplied by a pressure cycle source and wherein the amount of the lubricant or similar fluid that is metered may be adjusted to suit various requirements.

It is another object of the present invention to provide a metering system of the above character which is adapted to supply a preselected but adjustable quantity of fluid from a single pump to a plurality of individual metering mechanisms which may operate on different time cycles and dispense different amounts than the pump.

It is another object of the present invention to provide a new and improved fluid metering system of the above character which is relatively inexpensive to construct and operate, and which may be fabricated of standard materials and readily available components.

It is a further object of the present invention to provide a new and improved fluid metering system of the above character which is adapted to be easily adjusted so as to accurately and reliably meter predetermined quantities of lubricating fluids and the like.

In accordance with the principles of the present invention, the foregoing and other related objects and advantages are achieved through the provision of a novel fluid metering system which comprises an adjustable volume fluid accumulator and a positive displacement fluid dispensing device which functions to selectively discharge predetermined quantities of fluid into the accumulator. The system of the present invention also includes a pressure relief valve mechanism that is operable to selectively relieve the fluid pressure in the system, whereby fixed proportions of the fluid within the accumulator are dispensed from the system to one or more associated fluid output metering devices, the proportion or volume of the fluid dispensed being controlled by the displacement of the fluid dispensing device, the volume of the accumulator, or the construction of the output meters.

A more complete understanding of the present invention and other objects and features thereof will be obtained from the following detailed description taken in conjunction with the accompanying drawings, wherein:

FIGURE 1 is a longitudinal cross-sectional view of a preferred embodiment of the fluid metering system of the present invention;

FIG. 2 is a longitudinal cross-sectional view of one of the output meters associated with the system of the present invention; and FIG. 3 is a longitudinal cross-sectional view of an alternate embodiment of the fluid metering system of the present invention.

Referring now to FIGURE 1 of the drawings, a fluid metering system, generally designated by the numeral 10 and constructed in accordance with a preferred embodiment of the present invention, is shown as comprising a housing 12 which includes a main body section 14 and a closure section 16 that is rigidly secured to the upper end of the body section 14. The closure section 16 is formed with a vertically extending bore 18 that includes an enlarged diameter internally threaded upper bore section 20 and an enlarged diameter lower bore section 22, the former of which is adapted to have a suitable fluid fitting 24 threaded therewithin for securing a fluid inlet conduit 26 to the housing 12. The conduit 26 receives fluid from a pressure cycle source (such as the pump of U.S. Patent No. 3,145,804) and functions to communicate this fluid to the meter system 10, as will later be described. The closure section 16 may be secured to the top of the main body section 14 as by any suitable means, for example, suitable screws, bolts or the like (not shown), suitable gasket means 28 being provided between the lower edge of the closure section 16 and an upper edge portion of the body section 14 to prevent any fluid passage therebetween or between the various fluid passages within the body section 14, as will be apparent.

The main body section 14 of the housing 12 is formed with an annular metering chamber 30 that is vertically aligned with the aforementioned bore 18 and which is communicable at its lower end with a downwardly extending bore 32. A fluid outlet tube 34 having a central bore 36 and provided with a flat disc-shaped stop 38 on the upper end thereof is coaxially supported within the chamber 30 by having its lower end press fitted within the upper end of the bore 32. A port 40 is formed in a medial section of the tube 34 and communicates the bore 36 with the lower end of the metering chamber 30. A fluid pressure responsive piston assembly, generally designated 42 and comprising a resilient annular sealing member 44 and a hollow cylindrical spacer 46 is slidably disposed within the metering chamber 30 coaxially of the outlet tube 34. Preferably the thickness of the sealing member 44 is slightly larger than the radial distance between the inner periphery of the chamber 30 and the outer periphery of the tube 34 so that upon assembly of the piston assembly 42 within the chamber 30, the sealing member 44 will be slightly compressed to provide a fluid-tight, but slidable seal between the piston assembly 42 in the adjacent sides of the chamber 30 and outlet tube 34. The sealing member 44 is formed with an upwardly extending shoulder portion 48 which is adapted to abut against the lower side of the stop 38. It may be noted that the inside diameter of the spacer 46 is slightly larger than the outside diameter of the tube 34 and thus the spacer 46 is freely slidable with the sealing member 44 along the tube 34.

A cup-shaped sealing retainer 50, which is fabricated of a resilient fluid impervious material, such as synthetic rubber or the like, is slidably disposed within the chamber 30 between the upper end of the outlet tube 34 and a radially inwardly extending portion 52 that is formed at the juncture of the bore section 22 and the upper end of the chamber 30. The lower side of the retainer 50 is formed with an annular recess 54 which defines a central downwardly projecting boss portion 56. When the retainer 50 is in its lowermost position illustrated in FIGURE 1, the portion 56 is adapted to engage the upper end of the outlet tube 34 which projects slightly above the upper surface of the stop 38, whereby an effective fluid seal is provided between the interior of the chamber 30 and the outlet tube's central bore 36. The upper end of the outer periphery of the retainer 50 is spaced radially inwardly from the chamber 30, the lower end of the retainer periphery, herein designated by the numeral 58, extending downwardly and radially outwardly and resiliently engaging the periphery of the chamber 30 to selectively permit fluid flow from the bore section 22 to the interior of the chamber 30, as will be described.

A helical coil spring 60 extends coaxially of the outlet tube 34 and the spacer 46 between the lower end of the chamber 30 and a radially outwardly extending shoulder section 62 that is formed at the upper end of the spacer 46. The spring 60 and the sealing retainer 50 are designed such that when normal static fluid line pressure exists within the bore 18, the spring 60 resiliently maintains the piston assembly 42 engaged with the stop 38, whereby the sealing retainer 50 is compressed between the top of the piston assembly 42 and the portion 52 of the housing 12. Also during static fluid pressure conditions, the peripheral portion 58 of the retainer 50 exerts a radially outwardly directed force against the periphery of the chamber 30, thereby providing a fluid-tight seal between the outer periphery of the retainer 50 and the periphery of the chamber 30. When the fluid pressure within the bore 18 increases, for example, when a pressure pulse occurs in the fluid source, the retainer 50 is biased downwardly into engagement with the top of the outlet tube 34, whereby the bore 36 in the tube 34 is effectively sealed as the boss portion 56 of the retainer 50 engages the upper end of the tube 34, as above described. The increase in pressure also acts to compress the peripheral portion 58 of the retainer 50 radially inwardly away from the periphery of the chamber 30, thus providing an annular flow orifice between the outer periphery of the retainer 50 and the periphery of the chamber 30. As the portion 58 moves out of engagement with the periphery of the chamber 30, pressurized fluid flows downwardly around the retainer 50 and forces the piston assembly 42 downwardly against the resistance of spring 60, as seen in FIGURE 1. As the piston assembly 42 moves downwardly within the chamber 30, fluid within the chamber 30 below the piston assembly 42 is forced through the port 40 in the outlet tube 34 and downward through the bore 32, from where it is communicated to the rest of the system, as will later be described.

When the fluid line pressure is relieved, the coil spring 60 biases the piston assembly 42 upwardly within the chamber 30, whereby the fluid between the top of the assembly 42 and the bottom of the retainer 50 forces the retainer 50 upwardly into engagement with the portion 52 of the housing 12. It may be noted that as soon as the pressure pulse in the bore 18 is relieved, the outer peripheral portion 58 of the retainer 50 engages the chamber 30 due to the retainer's natural resilient character. The fluid under pressure between the lower end of the retainer 50 and assembly 42 functions to maintain sealing engagement between the portion 58 and chamber 30 to prevent fluid from bypassing the retainer 50. As the retainer 50 moves upwardly within the chamber 30, the boss portion 56 on the lower side thereof moves out of sealing engagement with the top of the tube 34, whereby the fluid between the retainer 50 and the piston assembly 42 will be forced into the bore 36 of the tube 34. It may be noted that as the piston assembly 42 is biased upwardly within the chamber 30, it creates an area of lowered pressure which causes the fluid that has been displaced by the upward movement of the piston assembly 42 and which has been forced into the outlet tube 34 to be drawn into the lower end of the chamber 30 through the port 40. The fluid thus drawn into the chamber 30 comprises the next successive "shot" or charge of fluid which will be dispensed from the chamber 30 upon the next pressure pulse in the fluid source.

The portion of the bore 32 directly below the lower end of the tube 34 is communicable with a transversely extending fluid passageway 64 which is in turn communicable at its left end with an intermediate chamber 65 that is selectively communicable with an annular relief valve chamber, generally designated by the numeral 66, as will later be described. The chamber 66 is also communicable with another transversely extending passage 68 that intersects the lower end of a vertically extending fluid passageway 70 whose upper end is formed with an enlarged diameter check valve chamber 72. The chamber 72 is provided with a spherical check valve member 74 which is resiliently biased into engagement with an annular shoulder 76 at the lower end of the chamber 72 by a helical coil spring 78. The upper end of the chamber 72 is communicable with the bore 18 in the closure section 16 by way of a generally L-shaped fluid passage 80 formed in the section 16, as seen in FIGURE 1. A suitable restrictor 81 such as a sintered metal plug, is provided in the left end of the passageway 68 to limit fluid flow out of the chamber 66, as will be described. Passage 68 does not communicate with passage 32.

The fluid passage 64 is communicable through a vertically extending passage 82 with a fluid accumulator chamber, generally designated by the numeral 84, which extends vertically within the housing 12. The chamber 84 is provided with a reciprocable plunger member 86 which is vertically slidable within the lower end of the chamber 84. Sealing means in the form of a conventional O-ring 88 is provided between the outer periphery of the plunger member 86 and the inner periphery of the chamber 84, which O-ring member 88 is carried within a suitable annular recess 90 formed around the outer periphery of the plunger member 86. The plunger member 86 is resiliently urged toward the lower end of the chamber 84 by means of a helical coil spring 92 whose lower end bears upon an annular shoulder 94 formed around the top of the plunger member 86 and whose upper end bears against the lower side of an externally threaded head section 96 of an adjustable stop member 98 that is threaded within the upper end of the chamber 84. The member 98 includes a downwardly extending cylindrical stop section 100 which is arranged coaxially within the chamber 84 and is nested within the upper end of the spring 92. The section 100 is adapted to have the upper end of the plunger member 86 abut against the lower end thereof and thereby serves to limit upward movement of the plunger member 86 within the chamber 84. It will be seen that appropriate adjustment of the member 98 within the chamber 84 will effect the axial position of the section 100 and thus the displacement of the plunger member 86 within the chamber 84, as will later be described.

Disposed within the relief valve chamber 66 is a resilient and deformable diaphragm member 102 which is supported by having its outer peripheral edge compressed between an annular shoulder portion 104 formed around the outer periphery of the chamber 66, and an externally threaded cup-shaped closure member 106 which is threaded within the open outer (left) end of the chamber 66, as seen in FIGURE 1. The center of the diaphragm 102 is resiliently engaged against an annular valve seat section 108 that extends around the left end of the passageway 64 by a helical coil spring 110 which is coaxially aligned with the valve seat section 108 and has its outer (left) end nested within an annular recess 112 formed in the center of the closure member 106. The opposite (right) end of the spring 110 abuts against an annular bearing plate 114. The diaphragm 102, spring 110 and bearing plate 114 provide a differential area-type poppet valve which requires a relatively high pressure to cause the diaphragm 102 to become unseated from the seat section 108; however, due to the substantially larger area of the diaphragm 102 which is exposed to the pressure of the fluid within the passageway 64 once the diaphragm 102 becomes unseated from the seat section 108, a somewhat lower fluid pressure is required to maintain the diaphragm 102 unseated from the section 108, as will later be described.

The lower end of the bore 32 is formed with an internally threaded section 116 within which a suitable fluid outlet conduit 118 is secured by a conventional fluid fitting 120. The downstream end of the conduit 118 is adapted to be communicable with one or more fluid outlet metering devices which are adapted to be connected in series and one of which is illustrated in FIGURES 1 and 2 and generally designated by the numeral 124.

Referring now to FIGURES 1 and 2, the metering valve 124 includes a housing 126 having a portion 128 mountable on a stationary support (not shown). The housing 126 includes an inlet port 130, which is communicable with the conduit 118 by a suitable fitting 132, and an outlet port 134 aligned with the inlet port 130 and connectible to a conduit 136 by a fitting 138 and leading to other metering valves 124 (not shown). A passage 140 connects the ports 130 and 134. The housing 126 has a relatively narrow lower portion 141 and a circular outwardly extending upper portion 142. A central bore 144 leads downwardly from the portion 142 into the lower portion 141 of the housing 126 and a central upward projection 146 is formed in the lower end of the bore 144 and spaced radially inwardly therefrom. A fluid passage 148 leads upwardly from the passage 140 through the projection 146.

An elastic tube or sleeve 150 of neoprene, rubber or other suitable elastic material that is not adversely affected by the fluid being dispensed is secured at its lowermost portion to the outer periphery of a projection 146 by a snap-ring 151 and extends upwardly therefrom, the outer periphery of the sleeve 150 being spaced radially inwardly from the bore 144. A ball-type valve 152 is disposed within the sleeve 150, which valve 152 is slightly larger in diameter than the unstressed internal diameter of the sleeve 150, as illustrated.

A diaphragm 154 is disposed above the upper portion 142 of the housing 126. This diaphragm, like sleeve 150, is formed of rubber, neoprene or similar suitable elastic material which is impervious to the fluid being communicated through the system 10. A dome or cover 156 is disposed above the diaphragm 154, the cover 156 preferably being fabricated of a transparent material such as any one of a number of well known plastics. The cover 156 is circular in shape and has a downwardly extending flange 158 engageable with the peripheral portion of the diaphragm 154. An upwardly extending in-turned flange 160 is formed at the periphery of the housing portion 142 and engages the cover 156 to firmly hold the cover 156 and diaphragm 154 in position. The height of the cover flange 158 is such that a chamber or volume 162 of a predetermined size will be formed between the cover 156 and the diaphragm 154, the diaphragm 154 having a normal position against the upper surface of the housing portion 142. The housing portion 142 is provided with radial grooves 164 and a circumferential groove 166 to facilitate fluid flow from bore 144 beneath the diaphragm 154.

A downwardly extending valve seat 168 is formed at the center of the diaphragm 154 and is engageable by the ball valve 152 when the latter moves upwardly. A central passageway 170 is formed in the seat 168, and a downwardly extending boss 172 is centrally formed on the cover 156 and engages the upper end of the seat 168 to limit upward movement thereof. The boss 172 is centrally grooved, which groove is contiguous with a radially extending groove 174 formed on the underside of the cover member 156.

An extension 176 is formed on the housing 126 transversely to the passage 140 within which an outlet or delivery port 178 is formed. A vertically extending bore 180 extends downwardly from the housing portion 142 in the vicinity of the extension 176, and an L-shaped passageway 182 connects the bore 180 with the port 178. A boss 184 is formed at the outer edge of the cover 156 and extends downwardly into the bore 180; this boss is provided with a groove which is contiguous with the groove 174. The port 178 is adapted to receive a suitable fitting or the like (not shown), whereby to communicate metered fluid to an outlet conduit for transporting fluid from the system 10 to its operative destination, as will hereinafter be described.

In order to preselect the metered quantity of fluid which will be dispensed from the metering valve 124, a centrally apertured disc member 186 may be disposed between the cover member 156 and the diaphragm 154, surrounding the boss 172. In practice, various thicknesses of disc 186 may be provided for various desired meter outputs which discs 186 may be fabricated of a plastic material and may, if desired, be color coded. Alternatively, the metered quantity of fluid which is dispensed from the valve 124 may be varied by changing the shape of the cover member 156.

In operation of the metering valve 124, assuming an initial condition in which the pressure at the inlet conduit 118 is reduced, the diaphragm 154 will be contracted into engagement with the housing portion 142, and the sleeve 150 will be in engagement with the ball valve 152, the latter being withdrawn downwardly from the seat 168. Upon elevation of the pressure in the conduit 118, fluid will flow from the passage 140 through the passage 148 and around the ball valve 152 and into the chamber formed between the lower side of the diaphragm 154 and the upper side of the portion 142, the fluid passing through the grooves 164 and 166. The ball valve 152 will be forced against the lower side of the seat 168, preventing fluid flow from the aforesaid chamber into the chamber 162, the boss 172 holding the seat 168 in position. This will cause the diaphragm 154 to be distended upwardly, reducing the size of the chamber 162 and forcing fluid therein to pass through the passageways 180, 182 and into the port 178. The volume of fluid thus delivered will depend upon the volume of the displacement chamber 162, i.e., upon the size of the disc 186 if such disc is present, and upon the relative dimensions of the housing 126 and cover member 156. Although the sleeve 150 will initially be forced outwardly away from the ball valve 152, the fluid pressure inside and outside of the sleeve 150 will become equalized and the sleeve will contract until it engages the outer periphery of the ball valve 152 even while the pressure is maintained in the conduit 118. When the pressure in the line 118 is relieved, as will later be described in connection with the overall operation of the system 10, the pressure in the chamber defined between the diaphragm 154 and housing section 142, will cause the ball valve 152 to be forced away from the seat 168, and passage 170 will be open so that fluid may flow from the chamber between the diaphragm 154 and housing section 142 to the chamber 162. The fluid will be urged to flow in this direction by the action of the diaphragm 154, which tends to assume the configuration illustrated in FIGURE 2. This cycle will be repeated on each reapplication of pressure to the conduit 118.

Assuming that the fluid inlet conduit 26 is connected to a source of fluid under pulse pressure, an exemplary operational cycle of the fluid metering system 10 is initiated at such time as a pressure pulse occurs in the aforesaid fluid system, whereby fluid is forced into the metering chamber 30, thereby biasing the piston assembly 42 downwardly and causing fluid to flow from the interior of the chamber 30 into the lower end of the outlet tube 34 through the port 40. The check valve 74 prevents fluid from flowing into the fluid passage 70 and the differential area diaphragm 102 prevents fluid flow through the chamber 66 and into passages 68 and 70, as will be apparent. The fluid which is forced out of the tube 34 passes into the fluid passage 64 and is communicated into the accumulator chamber 84 to force the piston 86 up toward stop 100. Simultaneously, fluid is communicated to the metering devices 124 through the conduit 118. Each succeeding pressure pulse continues to actuate the piston assembly 42, resulting in identical quantities of fluid being metered into the system, that is into the accumulator chamber 84 and into the metering valves 124 eventually filling the valves 124 and chamber 84. When the upper end of the plunger member 86 finally engages the lower end of the cylindrical portion 100 of the stop member 98, there is an abrupt pressure increase in the system due to the fact that the chamber will accept no more fluid. This pressure will overcome spring 110 and "pop" the diaphragm 102 off the valve seat 108 whereupon the pressure in the system acts over the entire area of the diaphragm 102 so that a substantially lesser amount of pressure is required to maintain the diaphragm 102 unseated than is required to initially unseat it. The accumulator then completely discharges as piston 86 descends and fluid flows into the chamber 66 as the diaphragm is unseated is released slowly through the restrictor 81 and passes through the return flow passageways 68, 70 and through the check valve 74 to flow through the bore section 72 and passage 80 back to the fluid source through the conduit 26 during the "off pressure" portion of the pressure source cycle. The system pressure, thus lowered, permits the metering valves 124 to complete their cycle (recharge), thereby initiating the next successive operational cycle of the system 10. Adjustment of screw 96 changes the volume of chamber 84 and therefore the timing of the cycle of discharge of meter 124.

Referring now to FIGURE 3 of the drawing, a fluid metering system 200, constructed in accordance with a modified embodiment of the present invention, is shown as comprising a housing 202 which includes a main body section 204 and a closure section 206, each of these sections being similar in construction and operation to the analogous sections 14 and 16 of the housing 12 described in connection with the metering system shown in FIGURE 1 of the drawings. The closure section 206 is formed with a vertical bore 208 which is adapted to threadably receive a suitable fitting 210 for connecting a fluid inlet conduit 212 to the system 200. The main body section 204 of the housing 202 is formed with a metering chamber 214 which is coaxially aligned with the lower end of the bore 208 and opens at its lower end into a downwardly extending bore 216 within which the lower end of a fluid outlet tube 218 is rigidly mounted. A pressure responsive piston assembly, generally designated 220 and including a sealing member 222, spacer 224, and spring 226, is disposed within the chamber 214, these members being identical in construction and operation to the members 44, 46 and 60, respectively, of the assembly 42 hereinbefore described. A cup-shaped sealing retainer 228, which is identical in construction to the retainer 50, is disposed within the upper end of the chamber 214.

The lower end of the bore 216 connects with a transverse passage 230 which in turn connects with a vertical bore 232. The upper end of the bore 232 opens into fluid accumulator chamber 234 within which an accumulator plunger 236, spring 238, and an adjustable stop member 240 are mounted, these members also being substantially identical in construction and operation to the members 86, 92 and 98, respectively, of the system 10.

The lower end of the bore 232 opens into relief valve chamber 242, which chamber in turn opens into a transverse return flow passage 244 that connects with a vertically extending passage 246 having a check valve chamber 248. The chamber 248 is substantially identical in construction to the chamber 72 in the metering system 10 and is provided with a ball check valve 250 held by coil spring 252. The upper end of the chamber 248 opens into a generally L-shaped fluid passage 254 formed in the closure section 206 of the housing 202 and communicable with the bore 208.

Fluid flow is selectively blocked between the bore 232 and passage 244 by means of a relief valve assembly which includes a spherical relief valve 256 which is resiliently urged into engagement with an annular shoulder 258 that is formed around the lower end of the bore 232 by means of a Belleville spring assembly 260. The spring assembly 260 is of a construction well known in the art and comprises a plurality of vertically aligned conical washers 262 which are slightly smaller in diameter than the chamber 242 and are arranged in a series of pairs, each pair of washers being oriented such that the concave sides thereof confront each other. The actual pressure response of spring 260 is similar to that of diaphragm 102 in that a substantially larger fluid pressure is required to force the valve 256 away from the shoulder 258 than is required to maintain the valve 256 in a position spaced away from the shoulder 258. The reason for this is that as the pressure increases, thereby forcing the valve 256 downwardly, each of the conical washers 262 is depressed and becomes more nearly flat. The flatter each of the washers 262 becomes, the less force is required to flatten it further, to the degree that a substantially low fluid pressure is required to hold the column of washers 262 completely compressed or flat. The lower end of the chamber 242 is closed by a plug member 264 which is threadably secured within the main body section 204 of the housing 202 and functions to support the lower end of the spring assembly 260 and provide means to adjust its initial setting.

The transversely extending passage 244 is communicable with a downwardly extending bore 266 which has a fluid outlet conduit 268 secured within the lower end thereof by means of a suitable fluid fitting 270. The conduit 268 is connected to one or more metering devices, such as the device 124 that was hereinabove described in connection with the fluid metering system 10.

Assuming that the fluid inlet conduit 212 is connected to a suitable source of fluid under pulse pressure, operation of the fluid metering system 200 is initiated as a pressure pulse occurs, at which time the piston assembly 220 is forced downwardly within the metering chamber 214 to force fluid through the lower end of the tube 218, fluid passage 230 and into the fluid accumulator chamber 234 through the vertically extending bore 232. Each succeeding pressure cycle causes fluid to be forced into the fluid accumulator chamber 234 until such time as the plunger member 236 engages the lower end of the stop member 240 at which time an abrupt pressure rise occurs within the passage 230. The relief valve 256 is then forced downwardly against the resistance of the spring assembly 260. As the valve 256 is thus biased, fluid is communicated from the chamber 234 to the passage 244, this fluid then being communicated through the bore 266 and conduit 268 to the fluid metering valves 124 through which it is metered to its operative destination. During the "off pressure" portion of the cycle, the fluid within the chamber 234 that is in excess of that required to actuate the metering valve 124 is communicated through the bore 246 and check valve chamber 248 back to the fluid source by way of the fluid passage 254 and conduit 212, thereby completing the operational cycle of the system 200.

It will be seen from the foregoing description of the fluid metering systems 10 and 200 of the present invention, that the ratio of input to output may be varied in a number of different ways. First of all, since each "shot" or charge of fluid that is dispensed from the metering chambers 30 and 214 is determined by the volumes of these chambers, the quantity of fluid that is dispensed from the systems 10 and 200 may be changed by varying the relative size of the chambers 30 and 214, i.e., by either increasing or decreasing the diameters or lengths thereof. In addition, the quantity of fluid which is dispensed from systems 10 and 200 may be changed by varying the volumes of the fluid accumulator chambers 84 and 234. This may be accomplished by changing the dimensions of the actual chambers or by varying the lengths of the stop portions of the members 98 and 240. Also, the volume of fluid which is dispensed from the metering systems 10 and 200 may be controlled by varying displacement of the individual fluid metering valves 124 as well as the number of valves 124. It will be seen, therefore, that the fluid metering systems 10 and 200 of the present invention, may be changed in a variety of different ways to accommodate various operative installations and that the volumes and cycles may be different than those of the cyclical pressure source.

The metering systems 10, 200 of the present invention are particularly directed toward use in lubrication systems where successive charges of lubricating oil are metered to various bearing surfaces, such as those found in vehicles, engines and in industrial machinery. However, the metering systems may be used to dispense successive "shots" or charges of liquid coolant, protective coatings, or other fluids.

While it will be apparent that the embodiments herein illustrated are well calculated to fulfill the objects above stated, it will be appreciated that the fluid metering systems 10 and 200 of the present invention are susceptible to modification, variation and change without departing from the proper scope or fair meaning of the subjoined claims.

What is claimed is:
1. A fluid metering system for delivering fluid from a fluid inlet to a pressure responsive fluid dispensing device and for cyclically varying the fluid pressure upon the dispensing device for actuating the dispensing device, said system comprising fluid accumulator means adapted to store a predetermined volume of fluid under pressure, fluid displacement means for sequentially delivering predetermined volumes of fluid from said fluid inlet to said fluid accumulator means for charging said fluid accumulator means, fluid return passage means extending from said fluid accumulator means to said fluid inlet, check valve means in said fluid return passage means for precluding fluid flow from said fluid inlet to said fluid accumulator means through said fluid return passage means and for permitting flow from said fluid accumulator means to said fluid inlet through the fluid return passage means, relief valve means in said fluid return passage means, said relief valve means being responsive to the pressure in said fluid accumulator means and being normally closed for precluding fluid flow from said fluid accumulator means to said fluid inlet through said fluid return passage means until the pressure in said fluid accumulator means exceeds a predetermined value, and conduit means for providing for fluid communication between the outlet side of said fluid displacement means and the fluid dispensing device for delivering fluid thereto.

2. A system as set forth in claim 1 including means for adjusting the volume of fluid contained by said fluid accumulator means.

3. A system as set forth in claim 1 wherein said relief valve means is of the type that requires greater pressure thereon to unseat it than to hold it in unseated position.

4. A system as set forth in claim 1 wherein the conduit means extends from the fluid accumulator means to the fluid dispensing device independent of the relief valve means.

5. A system as set forth in claim 1 wherein the conduit means extends at least in part from the fluid return passage means to the fluid dispensing device.

6. The invention as set forth in claim 1 wherein the fluid accumulator means includes a piston slidably mounted within an accumulator chamber, and adjustable stop means engageable with the piston for selectively controlling the displacement of said piston within said accumulator chamber.

7. The invention as set forth in claim 1 wherein said relief valve means comprises differential diaphragm area valve means adapted to selectively block communication between said fluid accumulator means and said fluid return passage means in response to the fluid pressure within fluid accumulator means.

8. A system as set forth in claim 1 wherein said relief valve means comprises a valve body and a Belleville spring assembly yieldably holding said valve body on its seat.

9. The invention as set forth in claim 1 which includes a plurality of fluid dispensing means arranged in series flow relationship with the conduit means.

10. A fluid metering system for delivering fluid from a fluid inlet to at least one pressure responsive fluid dispensing device and for cyclically varying the fluid pressure upon the dispensing device for actuating the dispensing device, said system comprising a fluid displacement meter defining first and second fluid chambers separated by a movable wall, conduit means interconnecting said chambers for fluid flow therebetween upon movement of said movable wall, means for introducing a source of pulsating fluid pressure to one of said chambers through said fluid inlet for moving said wall from a first position to a second position, biasing means for moving said wall from said second position to said first position, first fluid passage means extending from one of said chambers of said fluid displacement meter, a fluid accumulator, said first fluid passage means extending to said fluid accumulator for charging said fluid accumulator, a fluid return passage extending from said fluid accumulator to said fluid inlet, check valve means in said fluid return passage for permitting fluid flow from said accumulator to said fluid inlet through said fluid return passage and for precluding flow from said fluid inlet to said fluid accumulator through said fluid return passage, pressure responsive valve means in said fluid return passage and responsive to the fluid pressure in said fluid accumulator for preventing fluid flow from said fluid accumulator to said fluid inlet through said fluid return passage until the pressure in said fluid accumulator exceeds a predetermined value, and a second fluid passage extending from said first fluid passage means to the fluid dispensing device.

References Cited

UNITED STATES PATENTS

| | | | |
|---|---|---|---|
| 2,830,743 | 4/1958 | Rimsha et al. | 222—335 |
| 3,197,088 | 7/1965 | McKenzie | 222—335 X |
| 3,209,956 | 10/1965 | McKenzie | 222—335 X |
| 3,210,011 | 10/1965 | Barosko | 222—335 X |

ROBERT B. REEVES, *Primary Examiner.*

K. N. LEIMER, *Assistant Examiner.*